United States Patent
Hu et al.

(10) Patent No.: US 11,524,679 B2
(45) Date of Patent: Dec. 13, 2022

(54) ADAPTIVE CRUISE CONTROL WITH USER-DEFINED LATERAL ACCELERATION THRESHOLD

(71) Applicant: FORD GLOBAL TECHNOLOGIES, LLC, Dearborn, MI (US)

(72) Inventors: Guopeng Hu, Northville, MI (US); Yang Xu, Dearborn, MI (US); Zhengyu Dai, Canton, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/170,409

(22) Filed: Feb. 8, 2021

(65) Prior Publication Data

US 2022/0250620 A1 Aug. 11, 2022

(51) Int. Cl.
*B60W 10/18* (2012.01)
*B60W 30/14* (2006.01)
(Continued)

(52) U.S. Cl.
CPC .......... *B60W 30/143* (2013.01); *B60W 10/06* (2013.01); *B60W 10/10* (2013.01); *B60W 10/18* (2013.01); *B60W 30/18109* (2013.01); *B60W 30/18145* (2013.01); *B60W 40/072* (2013.01); *B60W 40/09* (2013.01); *B60W 40/109* (2013.01); *B60W 2520/125* (2013.01);
(Continued)

(58) Field of Classification Search
CPC .... B60W 30/143; B60W 10/06; B60W 10/10; B60W 10/18; B60W 30/18109; B60W 30/18145; B60W 40/09; B60W 40/109; B60W 2540/10; B60W 2540/12; B60W 2540/18; B60W 2540/30; B60W 2520/125; B60W 2720/125; B60W 2556/10; B60W 2720/106; B60W 2710/18; B60W 2710/0666; B60W 2710/1005; B60W 30/14
USPC ...................................... 701/93, 97; 477/203
See application file for complete search history.

(56) References Cited

U.S. PATENT DOCUMENTS 7,925,416 B2    4/2011  Perisho, Jr. et al.
2005/0269876 A1 * 12/2005 Higuchi ................... B60T 7/12
                                                        303/155

(Continued)

FOREIGN PATENT DOCUMENTS

JP          2005297814 A  * 10/2005

OTHER PUBLICATIONS

English translation of JP2005297814A; http://translationportal.epo.org; Mar. 16, 2022 (Year: 2022).*

*Primary Examiner* — Roger L Pang
(74) *Attorney, Agent, or Firm* — Vincent Mastrogiacomo; Brooks Kushman P.C.

(57) ABSTRACT

A vehicle includes an engine, an accelerator pedal, and a controller. The controller is programmed to command torque to the engine based on a set speed of adaptive cruise control and is programmed to, in response to the adaptive cruise control being active, a measured lateral acceleration of the vehicle exceeding a user-defined lateral acceleration threshold during a road curve, and the accelerator pedal being released, reduce a speed of the vehicle below the set speed until the measured lateral acceleration is less than the lateral acceleration threshold.

19 Claims, 4 Drawing Sheets

(51) Int. Cl.
*B60W 40/072* (2012.01)
*B60W 10/06* (2006.01)
*B60W 40/09* (2012.01)
*B60W 10/10* (2012.01)
*B60W 30/18* (2012.01)
*B60W 40/109* (2012.01)

(52) U.S. Cl.
CPC ..... *B60W 2540/10* (2013.01); *B60W 2540/12* (2013.01); *B60W 2540/18* (2013.01); *B60W 2540/30* (2013.01); *B60W 2552/30* (2020.02); *B60W 2556/10* (2020.02); *B60W 2710/0666* (2013.01); *B60W 2710/1005* (2013.01); *B60W 2710/125* (2013.01); *B60W 2710/18* (2013.01); *B60W 2720/106* (2013.01); *B60W 2720/125* (2013.01)

(56) References Cited

U.S. PATENT DOCUMENTS

| | | | |
|---|---|---|---|
| 2015/0307100 A1 | 10/2015 | Shimizu et al. | |
| 2016/0251014 A1* | 9/2016 | Tomiyama | B60W 30/143 701/96 |
| 2020/0247409 A1 | 8/2020 | Mayer et al. | |
| 2020/0377082 A1* | 12/2020 | Nassouri | B60W 30/143 |
| 2021/0197796 A1* | 7/2021 | Tezuka | B60W 30/045 |

* cited by examiner

ADAPTIVE CRUISE CONTROL WITH USER-DEFINED LATERAL ACCELERATION THRESHOLD

TECHNICAL FIELD

This disclosure relates to adaptive cruise control and to vehicle controls and methods used during operation of the adaptive cruise control.

BACKGROUND

Many automobiles come equipped with cruise control, which allows the driver to set a desired vehicle speed and the vehicle to automatically maintain that speed until cruise control is exited such as via application of the brake pedal, a clutch pedal, an exit button, or the like. More recently, some vehicles have come equipped with adaptive cruise control. Adaptive cruise control relies on sensor technology to sense the speed of vehicles in front of the host vehicle. Unlike traditional cruise control, which only operates at the set speed, adaptive cruise control will automatically reduce the speed of the host vehicle based on traffic conditions.

SUMMARY

According to one embodiment, a vehicle includes an engine, an accelerator pedal, and a controller. The controller is programmed to command torque to the engine based on a set speed of adaptive cruise control and is programmed to, in response to the adaptive cruise control being active, a measured lateral acceleration of the vehicle exceeding a user-defined lateral acceleration threshold during a road curve, and the accelerator pedal being released, reduce a speed of the vehicle below the set speed until the measured lateral acceleration is less than the lateral acceleration threshold.

According to another embodiment, a method of operating a vehicle in adaptive cruise control includes, in response to the vehicle being within a threshold distance of a road curve and a predicted lateral acceleration of the vehicle during the curve exceeding a user-defined lateral acceleration threshold, reducing a speed of the vehicle according to a user-defined deceleration target such that a measured lateral acceleration of the vehicle remains below the threshold through the curve.

According to yet another embodiment, a vehicle includes a controller programmed to propel a vehicle based on a set speed of adaptive cruise control, maintain the set speed in response to a first user profile being active and the vehicle having a first lateral acceleration during a road curve, and, in response to a second user profile being active and the vehicle having the first lateral acceleration during the curve, reduce the set speed to a speed that corresponds to a lateral acceleration of the vehicle that is less than a threshold lateral acceleration associated with the second user profile.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
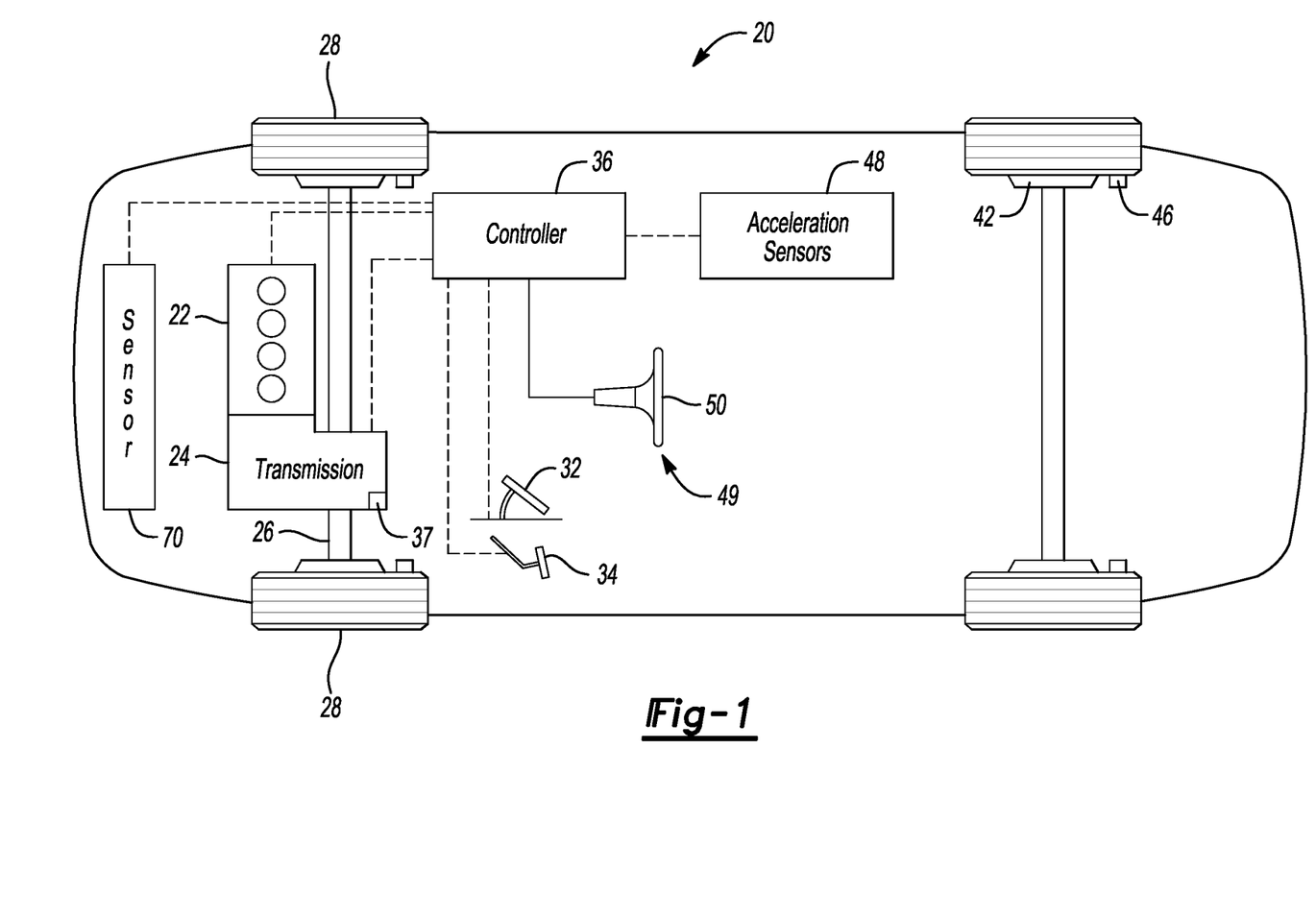
FIG. 1 is a schematic diagram of a vehicle.

An example front-wheel-drive vehicle 20 is schematically illustrated in FIG. 1. It is to be understood, however, that the vehicle could be rear-wheel drive, four-wheel drive, or all-wheel drive. The vehicle may be conventionally power by an engine or may be electrified and include a traction motor. As shown, the example vehicle 20 includes an engine 22 coupled to a transmission 24. The transmission 24 transmits power from the engine to a differential at a shaft speed suited to current vehicle needs, which may be faster or slower than the shaft speed at which engine 22 generates power. The differential reduces the shaft speed by a fixed final-drive ratio and transmits the power to the left and right driven wheels 28 via front half shafts 26.

The vehicle 20 includes a controller 36. The controller 36 may be a vehicle-based computing system that includes one or more controllers that communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers. An example of a vehicle-based computing system is the SYNC system manufactured by THE FORD MOTOR COMPANY. The SYNC system is described in U.S. Pat. No. 8,738,574, the contents of which are hereby incorporated by reference in its entirety.

An accelerator pedal 32 provides operator input to control a speed of the vehicle 20. The pedal 32 may include a pedal-position sensor that provides a pedal-position signal to the controller 36, which provides control signals to the engine 22. The accelerator pedal 32 is used by the driver to set a driver-demanded torque. The controller 36 receives the pedal-position signal and determines the driver-demanded torque based on the pedal-position signal, a speed of the vehicle, and the like. A vehicle speed sensor 37 may be disposed in the transmission 24 or other portion of the driveline. The speed sensor 37 is in communication with the controller 36 and is configured to output a signal indicative of a sensed speed. The controller is programmed to interpret that signal and determine the vehicle speed.

A brake pedal 34 provides operator input to control the friction brakes of the vehicle. The brake controller receives operator input through the brake pedal 34, and controls a friction brake system, which is operable to apply a braking force to the vehicle wheels. The pedal 34 may include a pedal-position sensor that provides a pedal-position signal to the controller 36. The controller 36 interprets the pedal-position signal of the brake pedal 34 to command instructions to the braking system.

The braking system may be a hydraulic system, an electric system, or a combination of electronic and a hydraulic. The braking system may include a brake module and a plurality of friction brakes 42 located at each of the wheels. Modern vehicles typically have disc brakes; however, other types of friction brakes are available, such as drum brakes. Each of the brakes 42 are in fluid communication with the brake module via a brake line configured to deliver fluid pressure from the module to a caliper of the brakes 42. The module may include a plurality of valves configured to provide independent fluid pressure to each of the brakes 42 such as in an anti-lock braking system. The brake module may be controlled by operation of a brake pedal 34 and/or by the vehicle controller 36 without input from the driver. The brake system also includes associated wheel-speed sensors 46 each located at one of the wheels. Each sensor 46 is configured to output a wheel-speed signal to the controller 36 indicative of a measured wheel speed.

In an electrified variant, the vehicle may be configured to slow down using regenerative braking, friction braking, or a combination thereof. The controller may include programming for aggregating a demanded braking torque between regenerative braking, i.e., the electric machines, and the friction brakes. The demanded braking torque may be based on driver input, e.g., a position of the brake pedal, or by the controller. The aggregator of the controller may be programmed to slow the vehicle using regenerative braking whenever possible and apply the friction brakes when necessary.

The vehicle 20 may include one or more sensors 48 configured to determine accelerations of the vehicle 20. For example, the sensors 48 may include a yaw-rate sensor, a lateral-acceleration sensor, and a longitudinal-acceleration sensor. Used herein, "acceleration" refers to both positive acceleration and negative acceleration (deceleration). The yaw-rate sensor generates a yaw-rate signal corresponding to the yaw rate of the vehicle. Using the yaw rate sensor, the yaw acceleration may also be determined. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. The various sensors are in communication with the controller 36. In some embodiments, the yaw rate, lateral acceleration, longitudinal acceleration, and other measurements may be measured by a single sensor or individual sensors may be used.

The vehicle 20 includes a steering system 49 that turns the front wheels 28. The steering system 49 may include a steering wheel 50 connected to a steering shaft that actuates a steering unit, such as a rack-and-pinion assembly. The steering unit is operably coupled to the front wheels 28 and turns the wheels according to inputs from the steering wheel 50. The steering system 49 may include one or more sensors configured to output a signal indicative of steering angle to the controller 36. The steering sensor may measure rotation of the steering shaft or movement of another component.

The vehicle 20 is equipped with adaptive cruise control (ACC), which is an improvement upon traditional cruise control systems. Traditional cruise control systems only allow the driver to set a cruise speed for the vehicle and requires driver intervention to reduce the vehicle speed. ACC systems include object sensing technology capable of detecting objects, e.g., other vehicles, in a forward path of the host vehicle. ACC systems autonomously reduce vehicle speed below the set speed to maintain safe following distance with slower moving traffic. The vehicle may slow by reducing engine torque and/or applying the brakes depending on the required speed reduction. ACC operates by receiving a set speed from the driver and propelling the vehicle according to the set speed under normal driving conditions. The set speed acts as a maximum vehicle speed when ACC is active. The ACC autonomously reduces vehicle speed as the host vehicle approaches slower forward traffic to maintain a safe following distance. When the slower traffic is no longer present, the ACC autonomously increases the vehicle speed back to the set speed to resume normal operation. As will be discussed in more detail below, the ACC of this disclosure, is also configured to autonomously reduce a speed of the vehicle below the set speed during cornering to maintain the vehicle below a user-defined lateral acceleration threshold.

Figure 2:
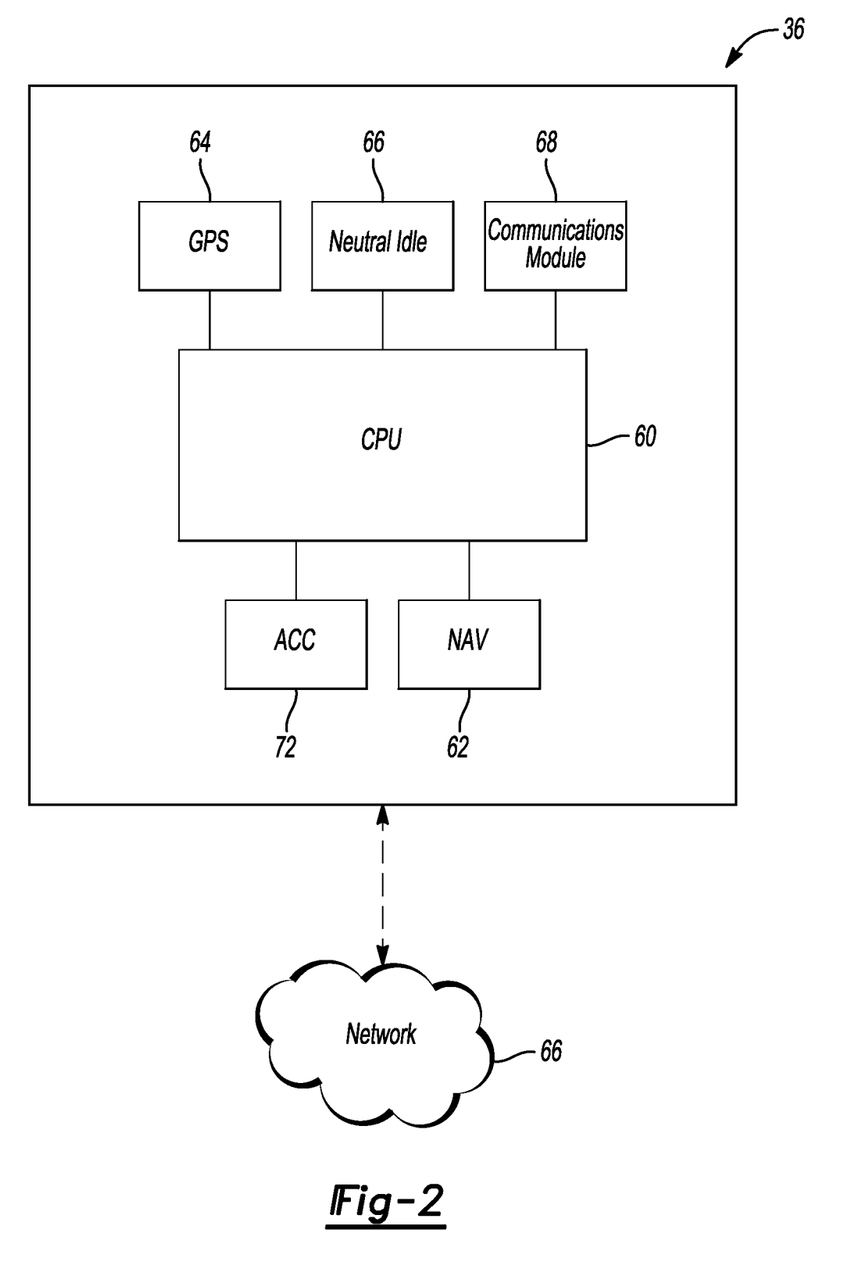
FIG. 2 is a schematic diagram of a portion of a vehicle-based computing system.

Referring to FIGS. 1 and 2, the controller 36 may include a central processing unit (CPU) 60 that controls at least some portion of the operation of the vehicle-based computing system. The processor is disposed in the vehicle 20 and allows onboard processing of commands and routines. Further, the processor is connected to both non-persistent and persistent storage. The non-persistent storage may be random access memory and the persistent storage may be a hard drive disk or flash memory.

The vehicle 20 may include a navigation system having a navigation module 62 and a global positioning system (GPS) module 64. The navigation module 64 is operable to access map data including information about the road such as the location of curves and their turning radii. Using the GPS module 64 and the navigation module 62, the controller 36 is operable to determine vehicle location on the map, vehicle heading, and vehicle speed. The map data may be stored in memory of the controller or on a remote network 66. The controller 36 may communicate with the network 66 via a communications module 68 using known techniques. In one embodiment, the navigation system includes Electric Horizon as part of its mapping system. However, other mapping products may also be used to provide the mapping information.

ACC uses onboard sensors 70, such as RADAR, LIDAR, ultrasonic sensors, optical systems, and/or other sensors, to detect the distance between the host vehicle and surrounding objects such as other vehicles or traffic-control devices. The ACC may be controlled by an ACC module 72 operable to automatically control the vehicle 20 using information from these sensors 70. For example, the ACC module 72 may automatically slow the vehicle according to traffic.

The ACC module 72 controls the speed of the host vehicle by sending signals to the controller 36 such as a requested speed. The requested speed may be the set speed if traffic conditions permit or may be a slower speed based on sensed conditions such as slower forward traffic. The controller 36 is programmed to receive the requested speed and send commands to the engine 22 and/or the braking system based on a difference between the ACC requested speed and a current measured vehicle speed. The controller may be programmed with acceleration and deceleration limits that cap the rate of change from the current speed to the desired speed.

During cornering (turning) the vehicle will experience lateral acceleration as well as yaw. The magnitude of lateral acceleration is based on vehicle velocity (v) and the radius of the curve (R). Lateral acceleration (LA) can be calculated using Equation 1: $LA=v^2/R$. From this equation it is observed that, for a same curve, increasing vehicle speed increases lateral acceleration and that, for a same vehicle speed, decreasing radius of the curvature increases lateral acceleration. The geometry of the road is fixed; therefore, the vehicle speed is a main variable in adjusting lateral acceleration during cornering.

Different drivers may have different preferences for a maximum lateral acceleration they wish to experience during driving. For example, some drivers may be perfectly comfortable experiencing 0.20 g during a curve whereas others would prefer to not exceed 0.15 g. The vehicle 20 accounts for this by saving a lateral acceleration threshold to a user profile. The vehicle 20 is configured to store multiple user profiles. The user profiles include stored setting such as seat position, radio setting, etc. This disclosure proposes to add a lateral acceleration threshold to the user profile. In some embodiments, the user profiles may be associated with a specific vehicle key such that the vehicle automatically selects that user profile when that specific vehicle key is used. Alternatively and/or additionally, the vehicle may include a button or other means for selecting between the user profiles.

The ACC module 72 is programmed to learn a driver's preference for lateral acceleration and save that preference as the lateral acceleration threshold in the user profile. The ACC module 72 may learn the driver's preference by monitoring brake pedal application during cornering to determine a driver's tolerance for lateral acceleration. That is, the ACC module 72 utilizes history data stored in a user profile to learn the driver's preference for lateral acceleration.

Control logic or functions performed by controller 36 may be represented by flowcharts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 36. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
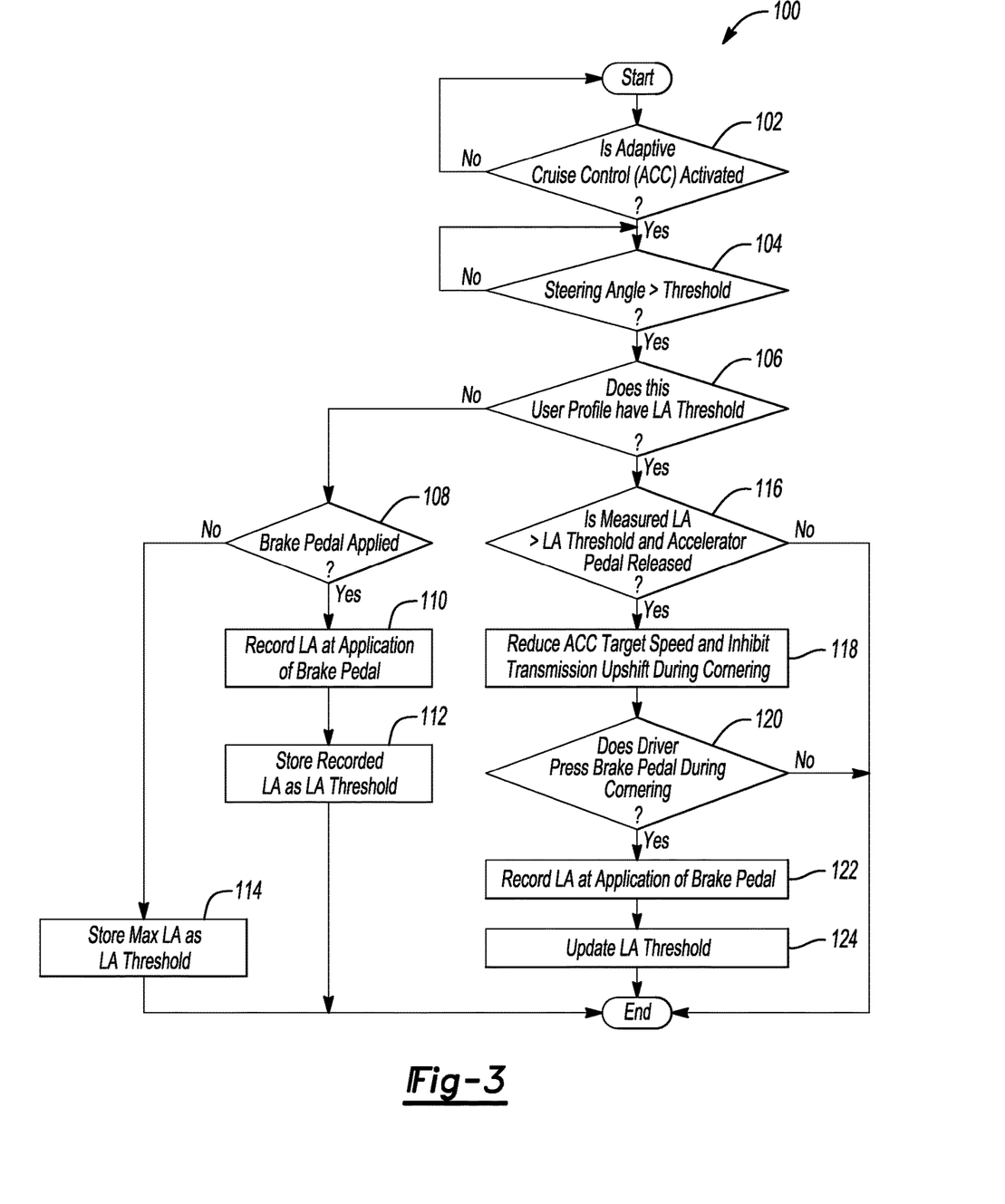
FIG. 3 is a flowchart of an algorithm for operating an adaptive cruise control system of a vehicle according to one or more embodiments.

FIG. 3 illustrates a flowchart 100 of an algorithm for learning and applying lateral acceleration limits during operation of the ACC system. At operation 102, the controller determines if the adaptive cruise control is activated. The active ACC system has a vehicle speed set point and the vehicle is controlled at that set point when traffic conditions permit as discussed above. If yes, control passes to operation 104 where the controller determines if the steering angle exceeds a threshold. The controller may receive a steering angle signal from a sensor associated with the steering wheel or other component. The controller then compares the measured steering angle to a threshold. The threshold may vary based on vehicle speed. For example, the threshold may decrease as vehicle speed increases. The threshold may be stored in a lookup table. If yes, control passes to operation 106. If no, control loops. Alternatively, the vehicle may use the yaw rate sensor or the like to determine if the vehicle is turning.

At operation 106, the controller determines if the active user profile has a lateral acceleration (LA) threshold stored in memory. If no, the controller performs a series of operations to learn the driver's preference for lateral acceleration. When the vehicle is turning (previously established at operation 104), the controller monitors application of the brake pedal. If the brake pedal is pressed during cornering, control passes to operation 110 where the controller measures the lateral acceleration. During operation of the vehicle, the acceleration sensors 48 may continuously measure vehicle accelerations such as the lateral acceleration according to a clock speed of the controller. At operation 110, the controller records the measured lateral acceleration near the instance the brake pedal is applied. Control then passes to operation 112 and the recorded lateral acceleration of operation 110 is stored as the lateral acceleration threshold for the active user profile.

If the brake pedal is not pressed during the curve, i.e., a no at operation 108, the controller stores the maximum lateral acceleration recorded during the curve as the lateral acceleration threshold at operation 114.

If the user profile has an associated lateral acceleration threshold at operation 106, control passes to operation 116. At operation 116, the controller monitors the measured lateral acceleration versus the lateral acceleration threshold during cornering. If the measured lateral acceleration exceeds the threshold, control passes to operation 118 where the ACC target speed is reduced below the set speed to reduce the lateral acceleration. The vehicle speed is reduced until the measured lateral acceleration is below the threshold. The ACC target speed may be based on an estimated curve radius. For example, the controller may include a 3D table that outputs radius of curvature based on measured vehicle speed and steering wheel angle. In operation 118, the transmission may be inhibited from upshifting so that the vehicle is in a lower gear conducive to accelerating the vehicle at curve exit.

The ACC module 72 communicates the new ACC target speed to the powertrain control module or other module of the controller 36. The controller 36 then decides how best to decelerate the vehicle based on the current vehicle speed and the new target speed. In some instances, the controller 36 may only reduce a torque command to the engine, i.e., coast, and in the others the controller 36 may reduce the engine torque command and apply the friction brakes.

Despite having a stored lateral acceleration threshold, the controller may continue to employ learning. As such, the controller monitors the brake pedal during cornering at operation 120. Driver application of the brake pedal indicates dissatisfaction with the current lateral acceleration threshold, i.e., the lateral acceleration threshold is too high. If the driver applies the brake pedal at operation 120, the controller measures and stores the current lateral acceleration at operation 122. Control then passes to operation 124 and the controller updates the stored lateral acceleration threshold in the user profile. That is, the controller overwrites the old lateral acceleration threshold with the new lateral acceleration threshold.

The deceleration rate used to slow the vehicle may also be user defined. The controller may be preprogrammed with a default deceleration rate that may be increased or decreased based on user preference. The controller may have maximum and minimum deceleration rate boundaries that cannot be exceed. The controller may again use application of the brake pedal to determine the user preference. For example, if the brake pedal is applied after the vehicle has automatically begun deceleration, this indicates that the vehicle is not decelerating fast enough for this driver. As such, the deceleration rate may be increased as long as the maximum deceleration rate is not violated.

In some embodiments, the vehicle 20 is equipped with the navigation module 62 and the GPS module 64 and uses these technologies to control cornering speeds when the ACC system is active. Here, the vehicle is able to identifying upcoming curves in the road, determine the radius of the curve, calculate a vehicle speed that does not exceed the user-defined lateral acceleration threshold, and proactively reduce vehicle speed so that the vehicle remains below the user-define the lateral acceleration during the curve.

Figure 4:
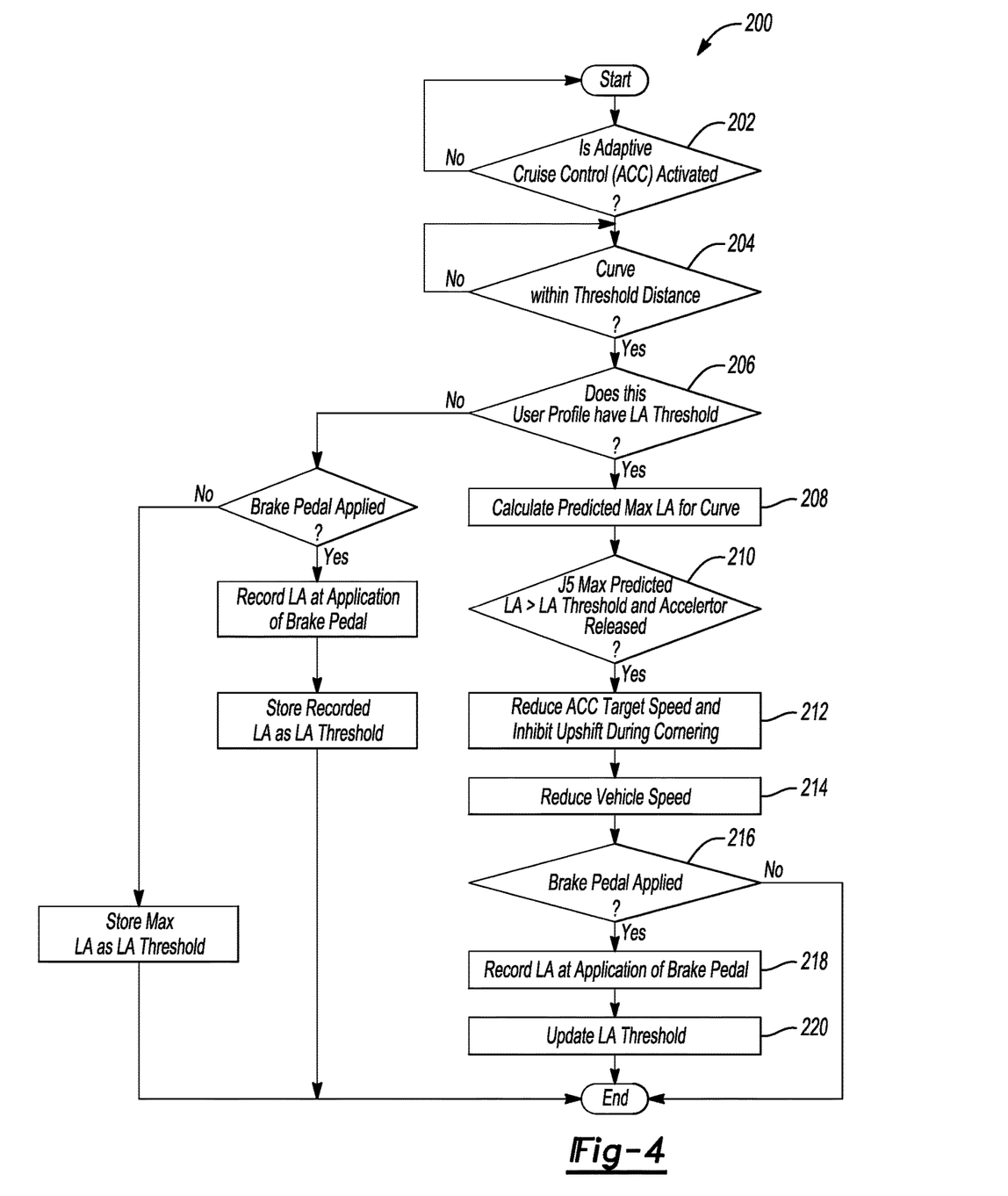
FIG. 4 is flowchart of another algorithm for operating an adaptive cruise control system of a vehicle according to one or more alternative embodiments.

Referring to FIG. 4, a flowchart 200 may be used to operate the ACC when the vehicle is capable of sensing road curvature and similar data. The flowchart 200 includes steps similar to that described above in FIG. 3 and the steps will not be described again for brevity. Control begins at operation 202 where the controller determines if the adaptive cruise control is activated. In this embodiment, the vehicle identifies upcoming curves in the road and controls the target ACC target speed accordingly. In this context, the programming may define a curve as being a section of road having a radius of curvature that is less than a threshold. That is, section of road having a radius of curvature that exceeds the threshold are not considered a curve by the programming despite not being straight. Radius of curvature threshold may be a dynamic value based on vehicle speed. For example, at a higher vehicle speed, the radius threshold can be higher, and, at lower vehicle speed, the radius threshold can be lower.

At operation 204, the controller determines if a distance between the vehicle and an upcoming curve is less than a threshold distance. The threshold distance may be between 500 and 1000 meters, for example. This may be determined using the GPS module 64 and the navigation module 62. The controller determines if the user profile has a lateral acceleration threshold. If no, the controller enters a learning mode as described at operations 108 through 114 in FIG. 3 and related text.

If the active profile does have an associated lateral acceleration threshold, control passes to operation 208. At operation 208 the controller calculates a predicted maximum lateral acceleration for the curve. In this embodiment, the vehicle speed is known as is the radius for the upcoming curve. As such, Equation 1 can be used to solve for lateral acceleration. The maximum lateral acceleration will occur at the tightest part of the curve and that is the radius of curvature used to determine the maximum lateral acceleration.

At operation 210, the controller determines if the predicted lateral acceleration is greater than the lateral acceleration threshold and the accelerator pedal is released. If no, the target ACC speed remains at the set speed. If yes, the controller reduces the ACC target speed below the set point to preemptively slow for the upcoming curve. The new target speed is set to a speed corresponding to the lateral acceleration threshold. Equation 1 may be used to calculate the new target speed at operation 212. At operation 212, the controller may also inhibit transmission upshift for the duration of the curve.

At operation 214, the controller reduces the speed of the vehicle from the current speed to the new ACC target as calculated in operation 212. The vehicle may be decelerated by reducing a torque command to the engine and/or applying the friction brakes depending upon the desired rate of deceleration, the distance from the vehicle to the curve, and the difference between the current speed and the ACC target. As discussed above, the deceleration rate may be a user-specified value that is bounded by minimum and maximum deceleration rates.

In operation 216, the controller determines if the driver actuates the brake pedal during the curve. If yes, this indicates that the previously stored lateral acceleration threshold is too high. The controller will then execute operations 218 and 220 as described above in FIG. 3 at operations 122 and 124.

The above-described embodiments customize the ACC system to better conform with driver preference. These improvements may allow for less driver intervention during operation of the ACC system as instances of driver-initiated braking are reduced due to the vehicle automatically limiting lateral acceleration below a driver's comfort level.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;

an accelerator pedal; and a controller programmed to, command torque to the engine based on a set speed of adaptive cruise control,  in response to (i) the adaptive cruise control being active, (ii) a measured lateral acceleration of the vehicle exceeding a user-defined lateral acceleration threshold during a road curve, and (iii) the accelerator pedal being released, reduce a speed of the vehicle below the set speed until the measured lateral acceleration is less than the lateral acceleration threshold, and  in response to a brake pedal being depressed and a steering angle of the vehicle exceeding a threshold, record lateral acceleration data of the vehicle and store a value of the recorded lateral acceleration data as the user-defined lateral acceleration threshold.

2. The vehicle of claim 1, wherein the user-defined lateral acceleration threshold is based on previously recorded lateral acceleration data of the vehicle recorded when a brake pedal is depressed.

3. The vehicle of claim 1, wherein the reduce a speed of the vehicle includes reducing torque commanded to the engine, applying brakes of the vehicle, or both based on a target deceleration.

4. The vehicle of claim 1, wherein the controller is further programmed to, in response to (i) the adaptive cruise control being active, (ii) the measured lateral acceleration of the vehicle exceeding the user-defined lateral acceleration threshold during the curve, and (iii) the accelerator pedal being released, inhibit a transmission upshift.

5. The vehicle of claim 1, wherein the controller is further programmed to, in response to a brake pedal being applied during the reduction in speed of the vehicle, record a value of lateral acceleration measured when of the brake pedal is depressed and update the user-defined lateral acceleration threshold to be the value of lateral acceleration.

6. The vehicle of claim 1, wherein the reduce a speed of the vehicle is based on a target deceleration of the vehicle.

7. The vehicle of claim 6, wherein the target deceleration of the vehicle is based on driver history data.

8. A vehicle comprising:

an engine;

an accelerator pedal; and a controller programmed to, command torque to the engine based on a set speed of adaptive cruise control,  in response to (i) the adaptive cruise control being active, (ii) a measured lateral acceleration of the vehicle exceeding a user-defined lateral acceleration threshold during a road curve, and (iii) the accelerator pedal being released, reduce a speed of the vehicle below the set speed until the measured lateral acceleration is less than the lateral acceleration threshold and inhibit a transmission upshift.

9. The vehicle of claim 8, wherein the user-defined lateral acceleration threshold is based on previously recorded lateral acceleration data of the vehicle recorded when a brake pedal is depressed.

10. The vehicle of claim 8 further comprising brakes.

11. The vehicle of claim 10, wherein the reduce a speed of the vehicle includes reducing torque commanded to the engine, applying the brakes, or both based on a target deceleration.

12. The vehicle of claim 8, wherein the controller is further programmed to, in response to a brake pedal being applied during the reduction in speed of the vehicle, record a value of lateral acceleration measured when of the brake pedal is depressed and update the user-defined lateral acceleration threshold to be the value of lateral acceleration.

13. The vehicle of claim 8, wherein the reduce a speed of the vehicle is based on a target deceleration of the vehicle.

14. The vehicle of claim 13, wherein the target deceleration of the vehicle is based on driver history data.

15. A vehicle comprising: an engine; an accelerator pedal; and a controller programmed to, command torque to the engine based on a set speed of adaptive cruise control, in response to (i) the adaptive cruise control being active, (ii) a measured lateral acceleration of the vehicle exceeding a user-defined lateral acceleration threshold during a road curve, and (iii) the accelerator pedal being released, reduce a speed of the vehicle below the set speed, based on a target deceleration of the vehicle and on driver history data, until the measured lateral acceleration is less than the lateral acceleration threshold, wherein the reduce a speed of the vehicle is based on a target deceleration of the vehicle, and wherein the target deceleration of the vehicle is based on driver history data.

16. The vehicle of claim 15, wherein the user-defined lateral acceleration threshold is based on previously recorded lateral acceleration data of the vehicle recorded when a brake pedal is depressed.

17. The vehicle of claim 15, wherein the reduce a speed of the vehicle includes reducing torque commanded to the engine, applying brakes of the vehicle, or both based on a target deceleration.

18. The vehicle of claim 15, wherein the controller is further programmed to, in response to (i) the adaptive cruise control being active, (ii) the measured lateral acceleration of the vehicle exceeding the user-defined lateral acceleration threshold during the curve, and (iii) the accelerator pedal being released, inhibit a transmission upshift.

19. The vehicle of claim 15, wherein the controller is further programmed to, in response to a brake pedal being applied during the reduction in speed of the vehicle, record a value of lateral acceleration measured when of the brake pedal is depressed and update the user-defined lateral acceleration threshold to be the value of lateral acceleration.

* * * * *